(12) United States Patent
Leskosek

(10) Patent No.: US 10,760,023 B2
(45) Date of Patent: Sep. 1, 2020

(54) SYNTHETIC ATOMIC FUEL AND A METHOD OF PRODUCING SAME

(71) Applicant: James Andrew Leskosek, Summerland (CA)

(72) Inventor: James Andrew Leskosek, Summerland (CA)

(*) Notice: Subject to any disclaimer, the term of this patent is extended or adjusted under 35 U.S.C. 154(b) by 187 days.

(21) Appl. No.: 15/935,876

(22) Filed: Mar. 26, 2018

(65) Prior Publication Data
US 2018/0273865 A1 Sep. 27, 2018

Related U.S. Application Data

(60) Provisional application No. 62/476,303, filed on Mar. 24, 2017.

(51) Int. Cl.
| | | |
|---|---|---|
| *C10L 3/08* | (2006.01) | |
| *H05H 1/24* | (2006.01) | |
| *B01J 19/08* | (2006.01) | |
| *B01J 19/12* | (2006.01) | |
| *H05H 1/46* | (2006.01) | |

(52) U.S. Cl.
CPC ............ *C10L 3/08* (2013.01); *B01J 19/088* (2013.01); *B01J 19/121* (2013.01); *H05H 1/24* (2013.01); *B01J 2219/0809* (2013.01); *C10L 2290/36* (2013.01); *H05H 1/46* (2013.01); *H05H 2001/4607* (2013.01)

(58) Field of Classification Search
CPC ....... C10L 3/08; C10L 2290/36; B01J 19/088; B01J 2219/0809; H05H 1/24
USPC ......................................................... 250/251
See application file for complete search history.

(56) References Cited

U.S. PATENT DOCUMENTS

| | | | |
|---|---|---|---|
| 2006/0212280 A1* | 9/2006 | Ross ..................... G21K 1/00 | 703/2 |
| 2008/0203731 A1* | 8/2008 | Dulcetti Filho ........ F03D 3/064 | 290/44 |
| 2017/0025190 A1* | 1/2017 | Gibson ..................... G21B 1/17 | |
| 2019/0068044 A1* | 2/2019 | Petrovich ............... G21C 13/02 | |

OTHER PUBLICATIONS

Energy Matter Conversion Corporation, Polywell Fusion, Enn Fusion Symposium, Apr. 20, 2018.
Wikipedia, "Time Crystal—Wikipedia", //en.wikipedia.org/wiki/Time_crystal.

* cited by examiner

*Primary Examiner* — Nicole M Ippolito
(74) *Attorney, Agent, or Firm* — Antony C. Edwards

(57) ABSTRACT

A method of producing atomic or quantum fuel includes the steps of providing a plurality of spinning bodies having mass, angularly accelerating the spinning bodies so as to spin each spinning body at angular velocities approaching the speed of light to thereby store energy in the spinning bodies, and in one embodiment so as to cause time dilation, triggering a conversion of the stored energy from an angular momentum of at least parts of the spinning bodies so as to convert the stored energy to translational or radiation energy.

10 Claims, 14 Drawing Sheets

SYNTHETIC ATOMIC FUEL AND A METHOD OF PRODUCING SAME

CROSS REFERENCE TO RELATED APPLICATION

This application claims priority to U.S. Provisional Patent Application No. 62/476,303, filed on Mar. 24, 2017 and entitled Quantum Fuel, entirety of which is incorporated herein by reference.

BACKGROUND

There are four known fundamental forces which control matter and energy; namely: strong nuclear forces, weak nuclear forces, electromagnetic force, and gravitational force. In the 1970s, physicists realized that there are very close ties between two of the four fundamental forces—the weak nuclear force and the electromagnetic force. The two forces can be described within the same theory, which forms the basis of the Standard Model. This "unification" implies that electricity, magnetism, light and some types of radioactivity are all manifestations of a single underlying force, known as the electroweak force.

The basic equations of the unified theory correctly describe the electroweak force and its associated force-carrying particles, namely the photon, and the W and Z bosons, except for one issue: all of these particles emerge from the equations without a mass. While this is true for the photon, we know that the W and Z bosons have mass, nearly 100 times that of a proton. The answer to this issue is the Brout-Englert-Higgs mechanism, proposed by the theorists Robert Brout, Francois Englert and Peter Higgs. This mechanism gives a mass to the W and Z bosons when they interact with an invisible field, called the "Higgs field", which pervades the universe. Immediately after the big bang, the Higgs field was zero, but as the universe cooled and the temperature fell below a critical value, the field grew spontaneously so that any particle interacting with it acquired a mass. The more a particle interacts with the Higgs field, the heavier it becomes. Particles like the photon that do not interact with the Higgs field are left with no mass at all. Like all fundamental fields, the Higgs field has an associated particle the Higgs boson.

For years, scientists unsuccessfully attempted experiments to observe the Higgs boson in order to confirm the Brout-Englert-Higgs mechanism. Then a breakthrough occurred on Jul. 4, 2012, when the ATLAS and Compact Muon Solenoid ("CMS") experiments at CERN's Large Hadron Collider ("LHC") announced they had each observed a new particle in the mass region of approximately 125 GeV. While the observations of the new particle are consistent with the Higgs boson, it will take further work to determine whether or not it is the Higgs boson predicted by the Standard Model. The Higgs boson, as proposed within the Standard Model, is the simplest manifestation of the Brout-Englert-Higgs mechanism.

The CMS and ATLAS detectors are used to investigate a wide range of physics, from the search for the Higgs boson to extra dimensions and particles that could make up dark matter. On 8 Oct. 2013 the Nobel Prize in physics was awarded jointly to Franøois Englert and Peter Higgs for the theoretical discovery of a mechanism that contributes to our understanding of the origin of mass of subatomic particles, and which recently was confirmed through the discovery of the predicted fundamental particle, by the ATLAS and CMS experiments at CERN's LHC. (The above excerpts were obtained from an article entitled "The Higgs Boson", published on the European Organization for Nuclear Research (CERN) website at https://home.cern/science/physics/higgs-boson; last accessed on Feb. 12, 2020).

NASA's Gravity Probe B ("GP-B") mission has confirmed two key predictions derived from Albert Einstein's general theory of relativity, which the GP-B spacecraft was designed to test. The experiment, launched in 2004 and decommissioned in 2010, used four ultra-precise gyroscopes to measure the hypothesized geodetic effect (the warping of space and time around a gravitational body), and frame-dragging (the amount a spinning object pulls space and time with it as it rotates). The GP-B determined both effects with unprecedented precision by pointing at a single star, IM Pegasi, while in a polar orbit around Earth. If gravity did not affect space and time, GP-B's gyroscopes would point in the same direction forever while in orbit. However, in confirmation of Einstein's theories, the gyroscopes experienced measurable, minute changes in the direction of their spin, while Earth's gravity pulled at them. (The above excerpts obtained from a NASA news release no. 11-134, dated May 3, 2011 and published on NASA's website at https://www.nasa.gov/home/hqnews/2011/may/HQ_11-134_Gravity_Probe_B.html; last accessed on Feb. 12, 2020).

A black hole is an astronomical object with a gravitational pull so strong that nothing, not even light, can escape it. A black hole's "surface," called its event horizon, defines the boundary where the velocity needed to escape exceeds the speed of light, which is the speed limit of the cosmos. Matter and radiation fall in, but they can't get out.

Two main classes of black holes have been extensively observed. Stellar-mass black holes with three to dozens of times the Sun's mass are spread throughout our Milky Way galaxy, while supermassive monsters weighing 100,000 to billions of solar masses are found in the centers of most big galaxies. A stellar-mass black hole forms when a star with more than 20 solar masses exhausts the nuclear fuel in its core and collapses under its own weight. The collapse triggers a supernova explosion that blows off the star's outer layers. But if the crushed core contains more than about three times the Sun's mass, no known force can stop its collapse to a black hole. Once born, black holes can grow by accreting matter that falls into them, including gas stripped from neighboring stars and even other black holes.

It has been observed by Albert Einstein that time travels slower the faster an observer travels. This is referred to as time dilation, or gravitational time dilation. This phenomenon is also seen in black holes where the flux (accretion disk) separates out and is compressed into almost a disc where, in the poles, time moves the slowest.

A black hole may be visualized slowing down time and storing all that energy but just before a mass hits the center or the zero point (event horizon) and everything disappears, imagine there is a transfer. Instead of losing the energy in the poles, the transfer breaks the gravitational ties and releases all that energy back into the present timeline.

Energy exists in two states; it's either being stored in time or released.

SUMMARY OF THE DISCLOSURE

The presently described synthetic atomic fuel may be in the form of a meta material or packet of potential radiative energy for example stored in a plane in a given space or along an axis by accelerating a spinning body having a low mass sufficiently to a high angular velocity so as to incorporate the effects of space time dilation as the angular velocity approaches to near to the speed of light. Thereafter the extracted energy extraction occurs as an emission or transmission of energy in the form of waves or particles through space or through a material medium in which the potential energy of the emission energy is released by a triggering event.

In summary, the present disclosure may be characterized in one aspect as a method of producing fuel comprising the steps of:
 a) providing a plurality of spinning bodies having mass,
 b) angularly accelerating the spinning bodies so as to spin each body in the plurality of spinning bodies at angular velocities approaching the speed of light to thereby store energy as stored energy in the plurality of spinning bodies, and in one embodiment so as to cause time dilation,
 c) triggering a conversion of the stored energy from an angular momentum of at least parts of the spinning bodies of the plurality of spinning bodies so as to convert the stored energy to translational or radiation energy.

In various embodiments the spinning bodies may be chosen from the group which includes:
 i. nano structures,
 ii. nano spheres,
 iii. nano turbines,
 iv. atomic particles,
 v. subatomic particles;
wherein the spinning of the nano structures, nano spheres, or nano turbines may be for example laser driven.

A plasma cloud may be generated to contain the spinning bodies.

The triggering step to convert the stored energy may be a triggering event which includes:
 a) for nano structures, nano spheres, nano turbines: heating the spinning bodies above a threshold temperature so as to break apart the nano structures, nano spheres, or nano turbines; and,
 b) for atomic particles or sub-atomic particles, removing a containing plasma cloud containing the particles.

The spinning of the atomic particles or subatomic particles may be caused by applying an alternating current. The particles may be contained within a plasma cloud. The plasma cloud may be formed into an accretion disc.

Where the spinning bodies are atomic or sub-atomic particles, the method may further include forming a plasma cloud accretion disc and accreting further atomic or subatomic particles during the time dilation due to the acceleration to near light-speed to thereby store further energy for release following the triggering step, wherein the triggering step includes disabling the plasma cloud.

BRIEF DESCRIPTION OF THE DRAWINGS

FIG. 1c is, in top view, the nano sphere/turbine of FIG. 1a.

DETAILED DESCRIPTION OF PREFERRED EMBODIMENTS

Figure 1:
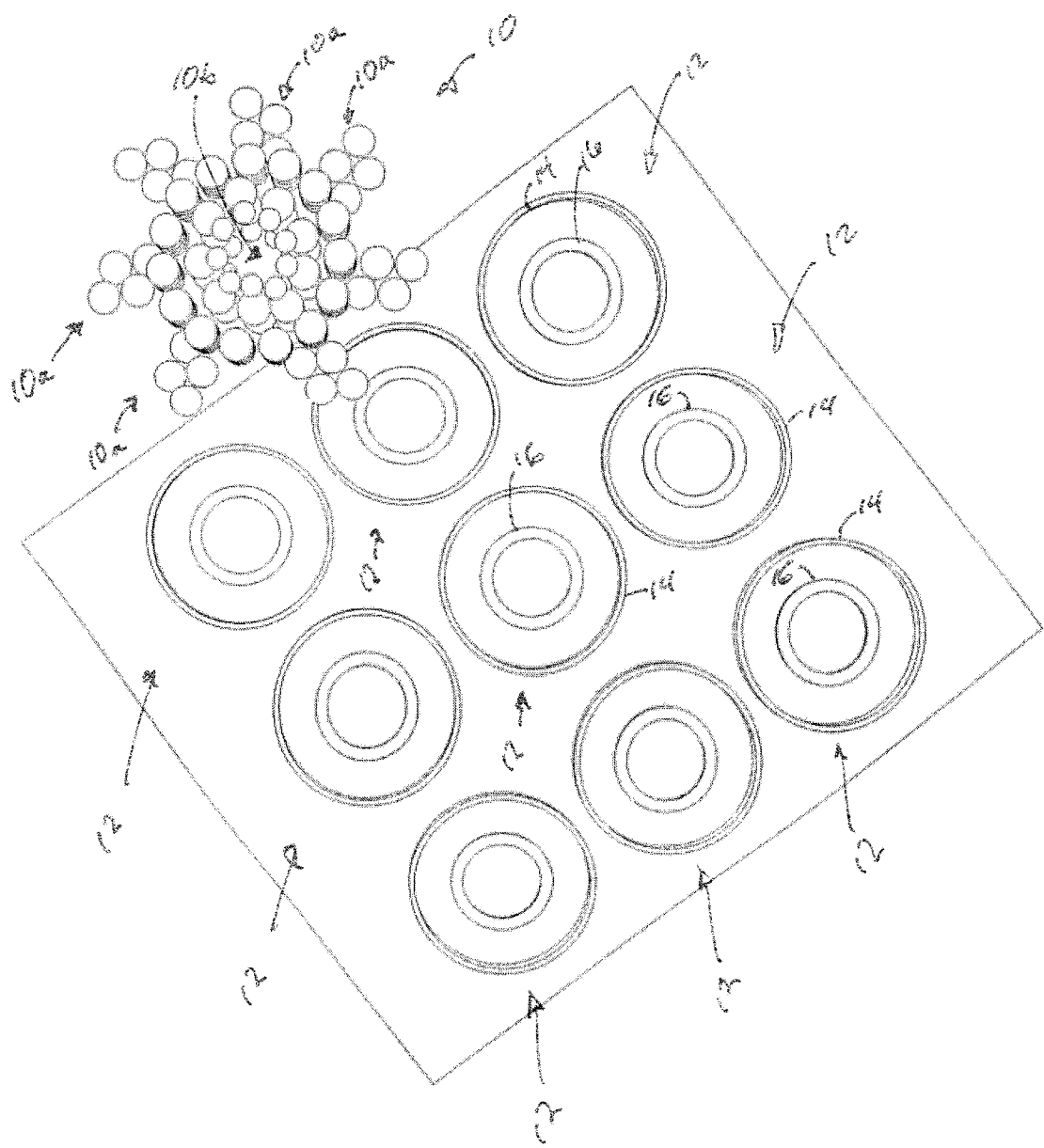
FIG. 1 is a top view of a nano sphere/turbine over a group of laser and a magnetic field or levitation devices.
Figure 1A:
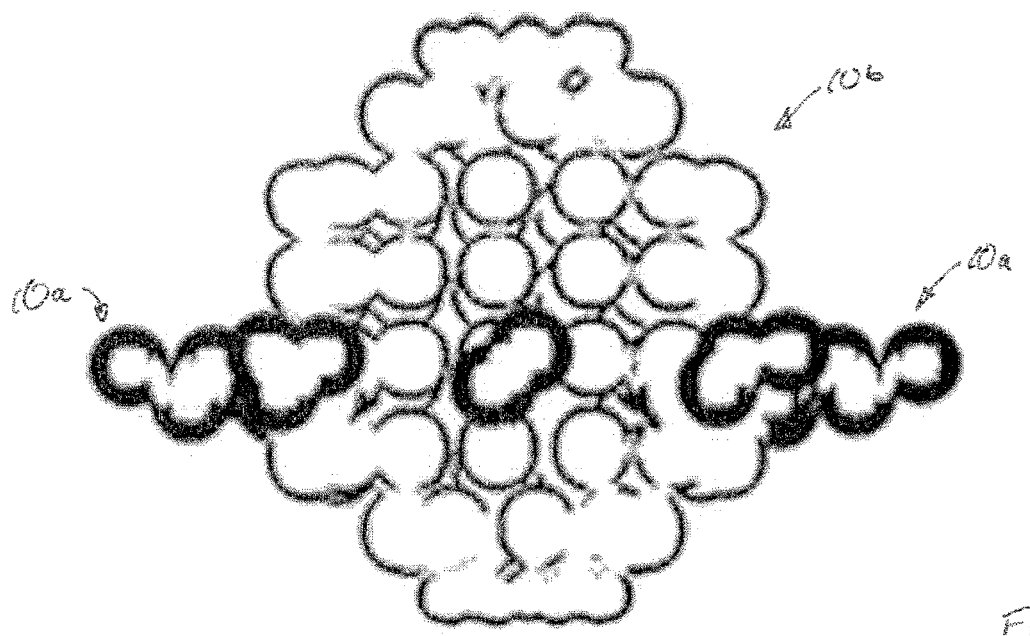
FIG. 1a is, in side elevation view, one embodiment of a nano sphere/turbine such as found in FIG. 1.
Figure 1B:
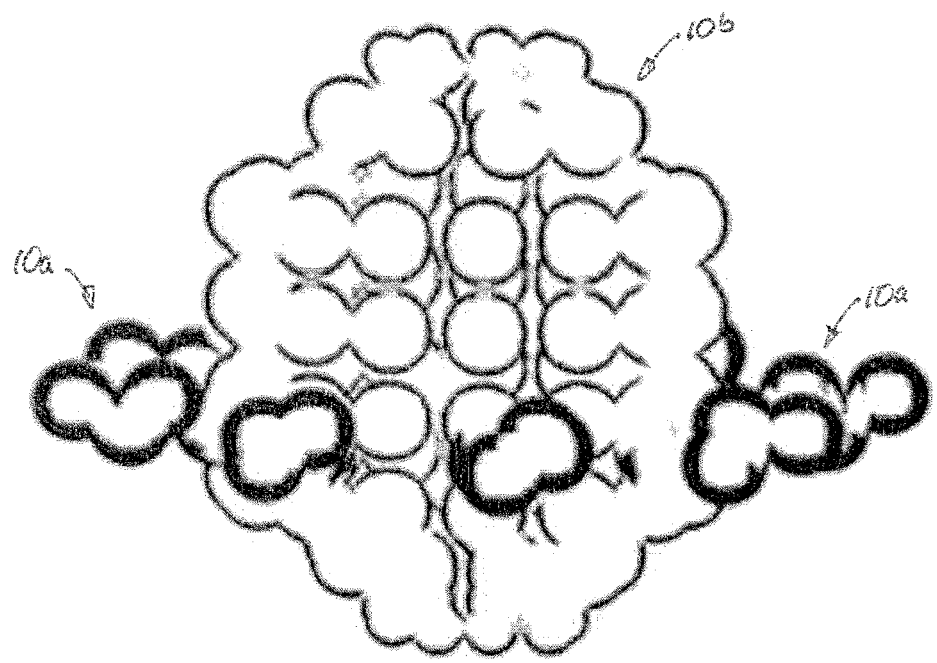
FIG. 1b is, in side elevation view, a further embodiment of a nano sphere/turbine such as found in FIG. 1.
Figure 1C:
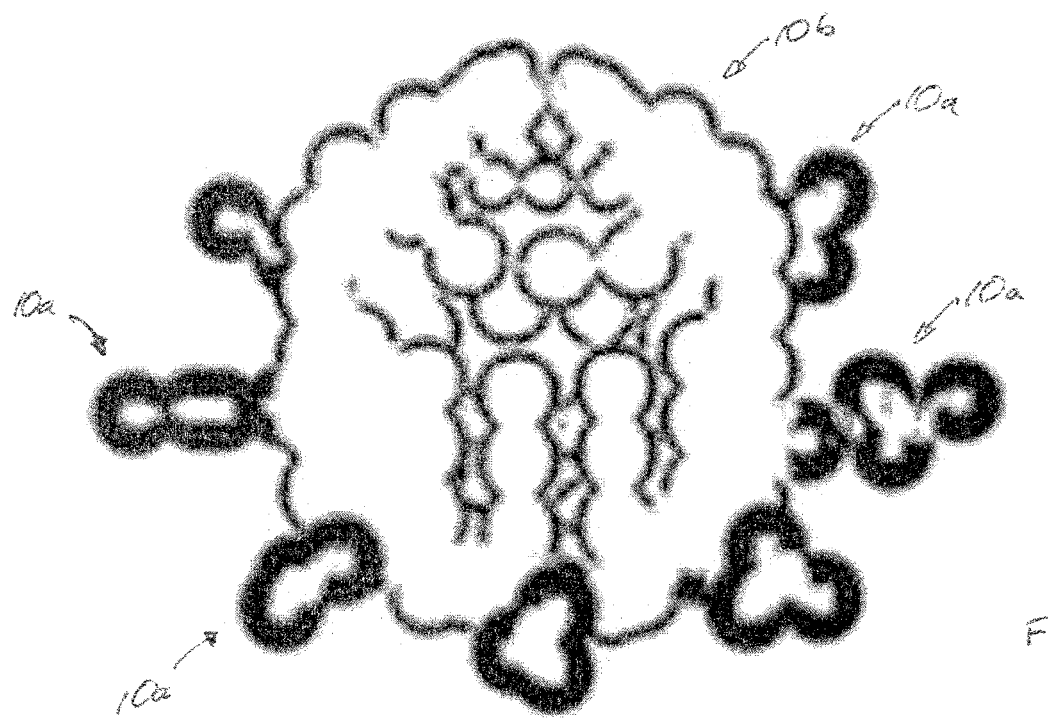
Figure 1D:
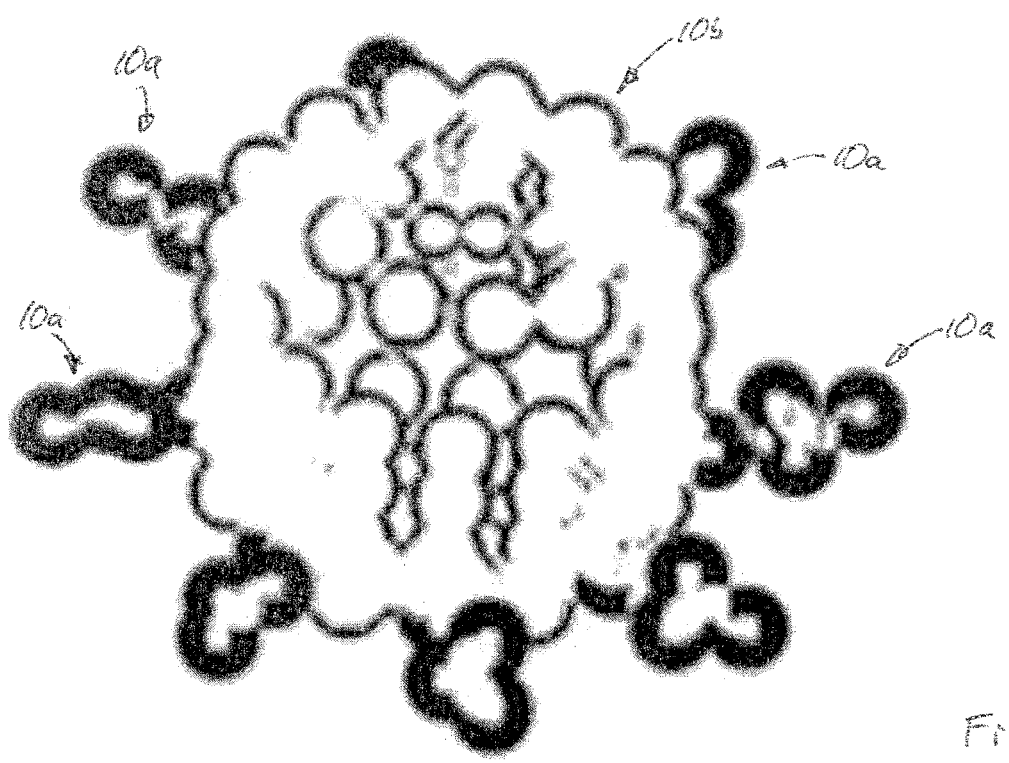
FIG. 1d is, in top view, the nano sphere/turbine of FIG. 1b.

Synthetic atomic fuel may be described as a synthetic atomic/chemical mechanical effect. The fuel is dependent on the amount of energy stored over time. This fuel can be made using atoms/atomic particles or, in a mechanical embodiment, made using nano designed synthetic structures having very small mass so as to be affected less by gravity, wherein the nano structures synthetically copy atomic movement.

One preferred embodiment of this nano structure embodiment of a synthetic atomic fuel is to make a nano structure that is round/sphere shaped, that has two pole points and a relatively heavy outer portion that would collide with other nano structures and release energy at the point of greatest potential energy. This is the flux over a time period. That is, each nano structure takes time to overcome its own mass/energy.

The nano structure would work best in a zero resistance vacuum environment; for example in space. Within such an environment, the nano structures are spun at extreme speeds so as to approach the speed of light; e.g. 99.9 percent of the speed of light. This may be done by using high energy lasers to spin the nano structures. When the spin velocity is sufficiently close to the speed of light the synthetic atomic fuel is ready for use. The fuel is used by initiating a triggering event so as to cause the nano structures to mechanically break up or split-up into multiple halves or pieces translating outwardly from the nano structure (such as its core) in many directions; releasing the stored energy like a slingshot. The energy potential instantly transfers to direct or transitional energy. The break-up of the nano structure causes multiple collisions with other nano structures, causing further break-up of those nano structures in a chain reaction as the parts of the spheres accelerate outwardly; replicating a chemical reaction with whatever potential energy was stored over time. For example, if you were to do the physics of the distance light travels in a given time, then store that energy much like a photon is stored in an atom over time, then you would be able to predict the energy that could be stored.

As stated above, in this embodiment the nano structure may be sphere shaped. A plurality of such nano spheres are suspended in a low resistance magnetic field or a diamagnetic field in a vacuum. Acoustic levitation may also be used. The nano spheres are spun by a laser hitting nano turbine vanes on the spheres to induce spinning of the spheres. Divots to induce spinning of the spheres may also be used. A lock such as a nano-structural lock or weld or adhesive or the like holds the parts of the nano sphere together. A triggering event that triggers unlocking of the parts of the nano-sphere to accomplish the energy conversion may be thermal temperature. When the chamber temperature of the chamber containing the suspended nano spheres exceeds the release temperature of the lock (e.g. it's melting point), the lock unlocks and releases the spinning outer weights, thus replicating a chemical reaction having material collide with other nano spheres creating heat and expansion. The same may be employed for other nano structures. Atomic or sub-atomic particles may also be employed instead of nano structures, although the triggering event is different as discussed below.

Hypothetically, it might also be possible to use atomic particle type of synthetic atomic fuel as an outer skin or shielding for a craft such as a space craft where the fuel doesn't spit up into its parts releasing the energy, but is used to accelerate the atoms natural disposition to resist time and gravity or shift poles out of phase, possibly to a level of lighter atom oscillation speeds like helium. In the case of spinning nano structures, because of their natural disposition to resist time, they are more likely to be polarized to the outer surface of the sphere. The spinning of the spinning bodies, such as nano structures or atomic/sub-atomic particles, may also be induced by microwaves or electron/plasma guns and magnetic fields.

A hybrid fuel system could also be used.

The presently disclosed concept was tested using a sphere to make sure that spinning of the sphere could be induced. An air jet pushed the sphere in a suspended distance from the air jet. The spherical shape allowed the sphere to be suspended in the air at a given distance. Small fan or turbine blades or vanes were mounted around the sphere which allowed the sphere to spin at a high rate of revolutions (rpm) in testing. A weight was installed at the bottom of the sphere. When the revolutions of the weight hit a certain speed, where its weight was being distributed like a gyroscope, the sphere started to flip over, so a tail was installed on the top of the sphere that resembled the movement of a falling maple seed. It was noted that the spinning of the sphere while being spun vertically was a slight bit uneven which would allow energy to escape causing the sphere to dart in one direction, then the other rapidly, or wobble. If the air source was changed at 90 degrees, the sphere would climb in altitude.

Applying the same principles to atomic or sub-atomic particles, for example electrons in plasma; the first step is feeding electrons into a center point of the plasma and then spinning the plasma thereby creating a vortex. This transforms the electron gas cloud into an accretion disc or into a quantum state. This would most likely work best by having a gas sealed in a vacuum chamber. This may possibly be done by using a high alternating current frequency through a center point that alternates, although this is not intended to be limiting. High alternating frequency current allows the electrons to form plasma through the gas. This is happening while the resistance of the gas excites and is being heated up.

Due to the electrical current periodically changing direction, the resulting draw forces the electrons to stay in the accretion zone. Then, by having a chamber that switches the direction of the draw to a circular pattern to induce a spinning of the electron cloud and by spinning the electron cloud faster, the AC plasma will form an accretion disc. As the accretion disc is forming, the faster moving electrons (possibly due to Time Dilation/Gravitational time dilation as the angular velocity approaches the speed of light) will allow more electrons to be fed into accretion disc. A type of electron vacuum may occur due to the accretion disc slowing down time for the electron as the speed approaches the speed of light.

A triggering event is then employed to release the stored energy. For example, the electromagnetic bond or draw is broken by cutting the power that maintains the plasma, resulting in an energy transfer which releases the stored electron energy back into the present timeline from its time dilated timeline. This means that there is no force holding the gas cloud together. Thus, the trigger for release of the energy is to remove the confining plasma. I hypothesize that due to the effects of Time Dilation/Gravitational time dilation, the electrons would most likely take the form of photonic particles accelerating outward due to speed rather than a wave form, although this is not intended to be limiting.

In this embodiment (again not meant to be limiting), a processor or CPU could be used much like a particle accelerator, where the CPU controls switches to allow the electrons to accelerate their speed around the accretion zone. The faster the processor speed in the CPU, the faster the switching of the motivational forces increasing the angular velocity and acceleration of the particles.

I also believe it could be possible to use a high alternating current to produce a plasma cloud, and then induce spinning with lasers in an offset pattern.

It is speculated that time dilation would have the same effects on an electron as on a photon.

There was a slow light experiment done by Lene Hau who led a team at Harvard University: a light wave was slowed down using Bose-Einstein condensate from approximately one to two miles long, then was compressed into slow light that was approximately in the size range of a micron, then expanded back into its regular size after leaving the gas cloud. Later work based on these experiments led to the transfer of light to matter, then from matter back into light. This means that the pulse was converted into a traveling matter wave, and shows the effects of time dilation on the photons, meaning the faster the light moves the less compressed the light wave is. So it is expected that the electrons in the electron vacuum would replicate this reaction.

Regarding holding electrons with AC power; at 60 Hz AC frequency, electrons oscillate back and forth in response to the alternating electric field over a distance of approximately a few micrometers. In a copper wire 2 mm in diameter at 1 amp the electrons are flowing at the rate of −0.000023 m/s. At 60 Hz alternating current, this means that within half a cycle the electrons drift less than 0.2 μm. So it may be speculated that Super high frequency (SHF) in the ranges of 3 GHz and 30 GHz or higher would most likely work better for holding the electron in place in the flux.

In one of the embodiments of the present method a processor or CPU was used. A terahertz range or higher CPU would improve command speeds for holding the electrons and spinning them.

In the laser embodiment, it is known that laser pulses may trigger and guide electric discharges. Lasers have been fired rapidly (each burst lasting only 50 femtoseconds) to guide the electrical discharge of a circuit.

Another example of laser manipulation would be laser cooling: since laser cooling of electron beams for linear colliders use photon colliders operating around laser flash energy of about 10 J, it is speculated that similar requirements would be needed to induce spinning of the flux in the laser embodiment.

Spinning the plasma cloud would most likely augment the shape of the cloud. It may start to resemble an electron vortex beam as done by University of Antwerp.

It may also resemble a plasma where the velocity of the charged particles is perpendicular to the uniform magnetic field, wherein the particles experience a magnetic force that urges them move in a circular path. However, if the direction of the velocity of the beam is at some arbitrary angle, the charged particles may form a helix.

Thus as seen in FIG. 1, one embodiment of the fuel system uses nano-spheres 10, shown enlarged in FIG. 1, suspended over an array of laser/levitation devices 12. The levitation component may be an electro-magnetic (not shown) in the base of device 12. The outer ring of device 12 denotes a first laser 14. The inner ring of device 12 denotes a second laser 16. Laser 14 may be of higher power than laser 16 in embodiments where for example that arrangement may assist in containing the nano-spheres 10 within an acceleration/spinning device such as described below. Nano-spheres 10 may include turbine-like protuberances or outwardly extending structure such as arms 10a which surround and/or extend from a core 10b which may for example be spherical.

Two possible variants of nano-spheres 10 are seen in FIGS. 1a-1d, showing each nano-sphere having arms 10a and a core 10b.

Figure 2:
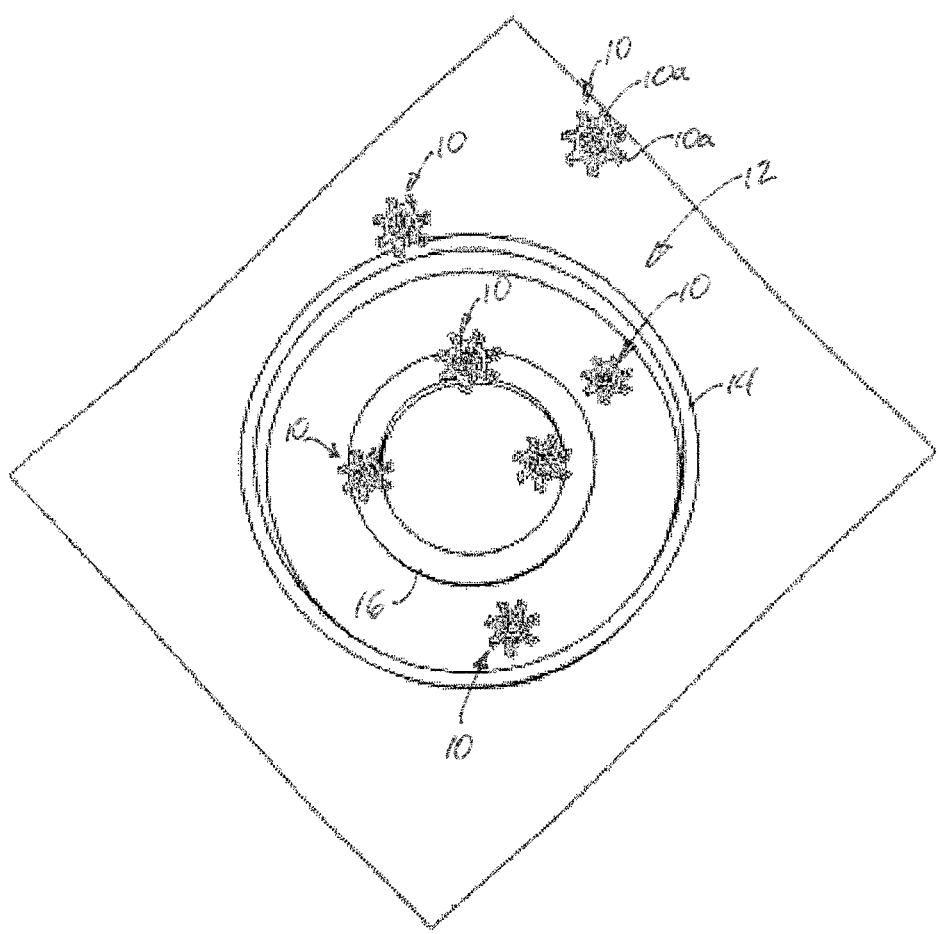
FIG. 2 is a top perspective view of multiple nano spheres/turbines over a laser and a magnetic field or levitation device.
Figure 3:
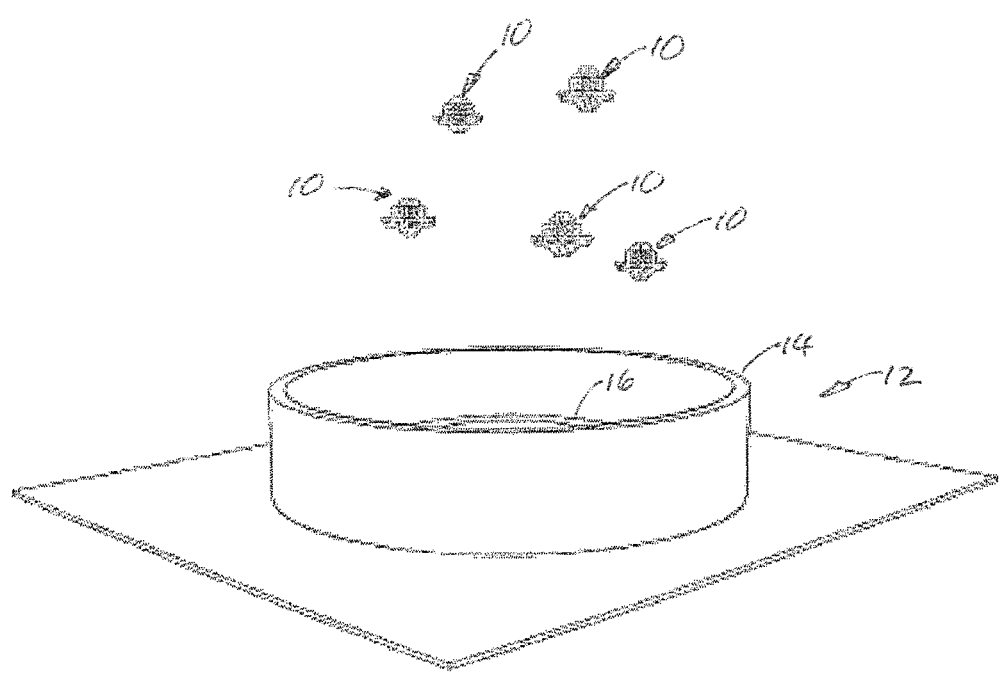
FIG. 3 is a side perspective view of the nano spheres/turbines over the laser and magnetic field or levitation device of FIG. 2.

As seen in FIGS. 2 and 3, the lasers/levitation devices 12 may hold a plurality of nano-spheres 10 suspended over the devices 12 while the lasers 14, 16 cause the nano-spheres 10 to spin and angularly accelerate. As described above, upon a triggering event, the nano-spheres 10 break apart.

Figure 4:
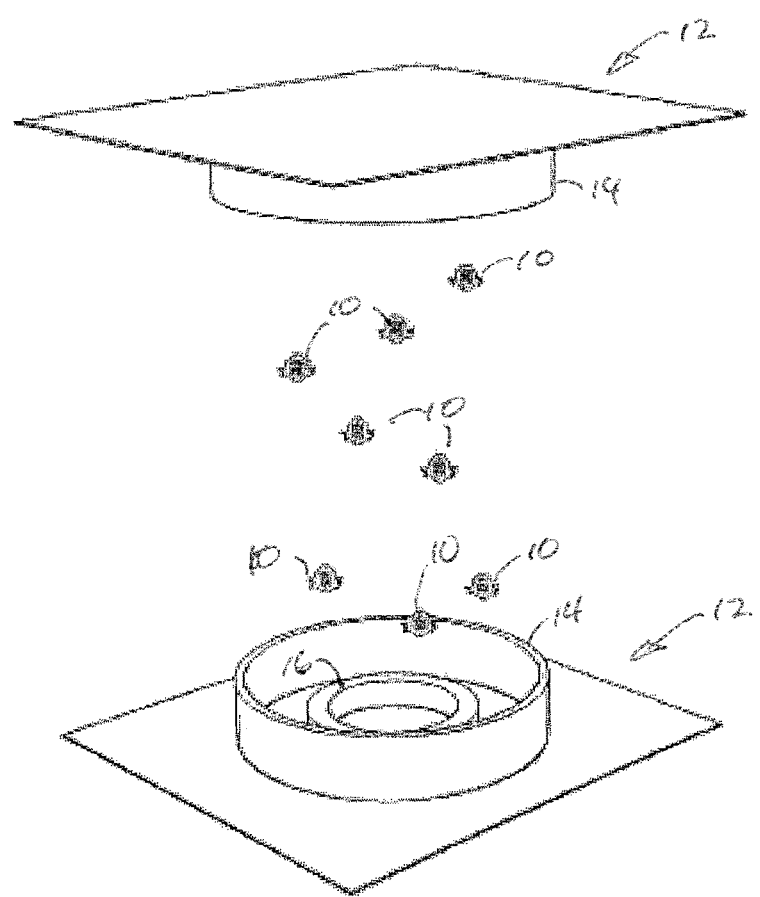
FIG. 4 is a side perspective view of multiple nano spheres/turbines between a top and bottom double laser and double fixed magnetic field or levitation devices.

As seen in FIG. 4, an oppositely disposed pair, in this case upper and lower, of opposed facing laser/levitation devices 12 may also be employed to suspend nano-spheres 10 therebetween so that the nano-spheres may be spun and accelerated.

Figure 5:
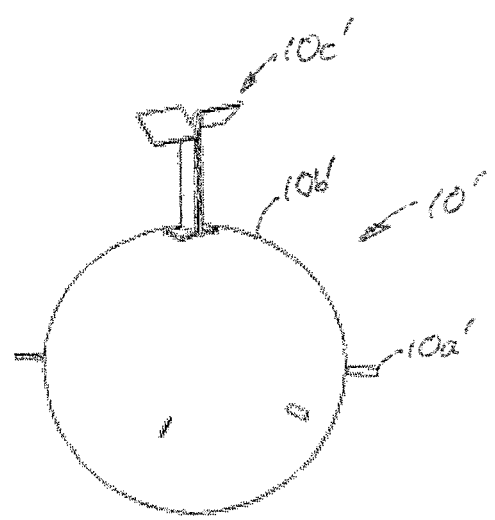
FIG. 5 is an image of the test turbine sphere that was used in the air jet experiment referred to herein.

FIG. 5 illustrates a test embodiment of a simulated nano-sphere 10' employed in the experiment described above. Turbine structures 10a' are mounted on a spherical core 10b'. A stabilizing fin 10c' was also employed as described above.

Figure 6:
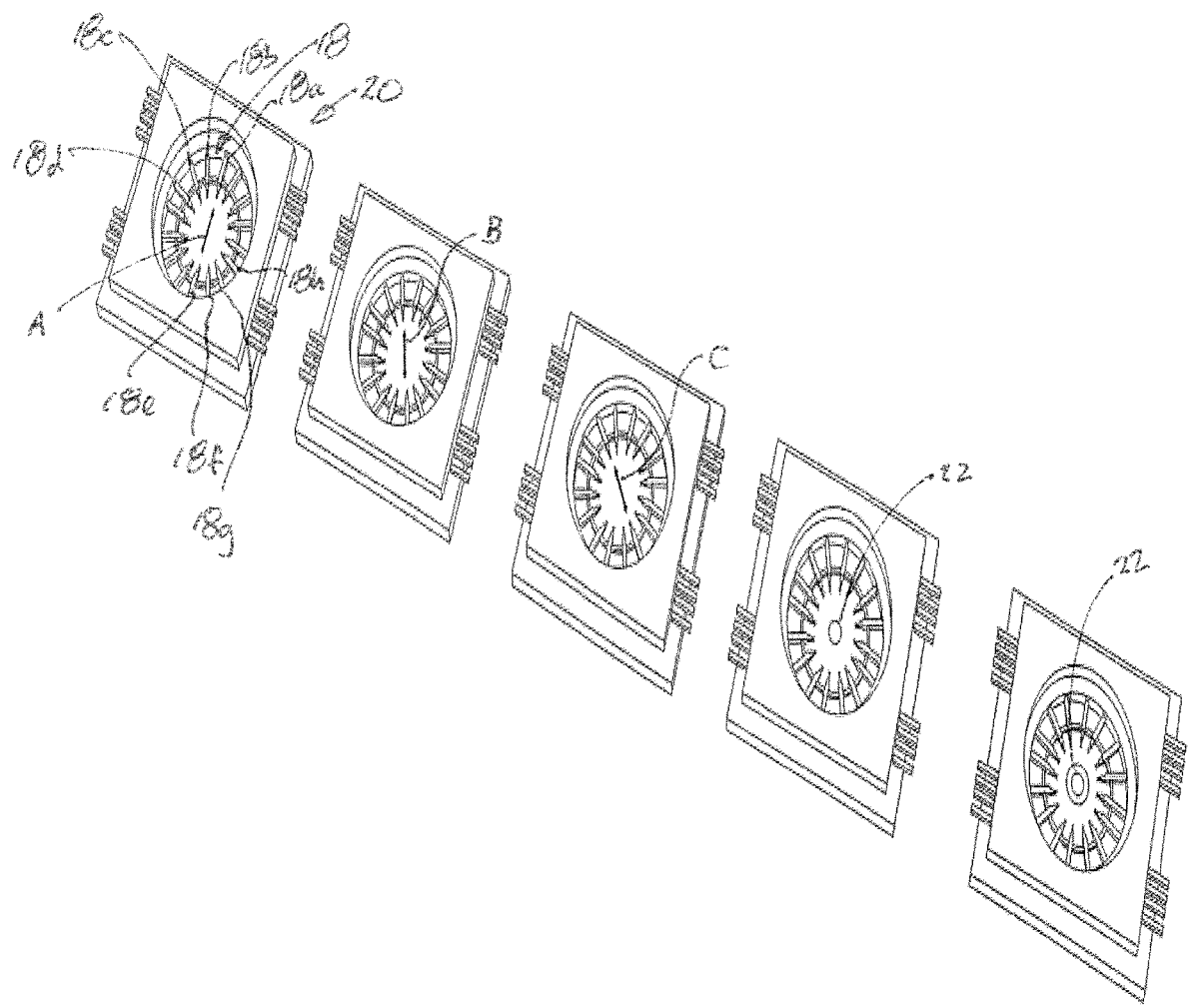
FIG. 6 is a view of the AC plasma/electron cloud accelerator/spinner and the stages or cycles of the acceleration in the accretion disc.

FIG. 6 illustrates a sequence of the firing of electrodes 18 configured in a radially equally-spaced apart array around the circumference of levitation device 20, wherein levitation device 20 may again be electro-magnetic. Electrodes 18 are fired in sequence in opposed pairs around the circumference of device 20 so as to form, spin and accelerate an accretion disc 22 of plasma centered at the radial center between the pairs of electrodes 18. So for example, arrow A indicates that paired electrodes 18a, 18e are firing, followed by paired electrodes 18b, 18f firing (arrow B), then by paired electrodes 18c, 18g (arrow C), then by paired electrodes 18d, 18h and so on in a continuous circular fashion at a firing frequency governed for example by the limits of the switching/processing speed of an associated digital processor (not shown). The electrodes lie in the plane of accretion disc 22.

Figure 7:
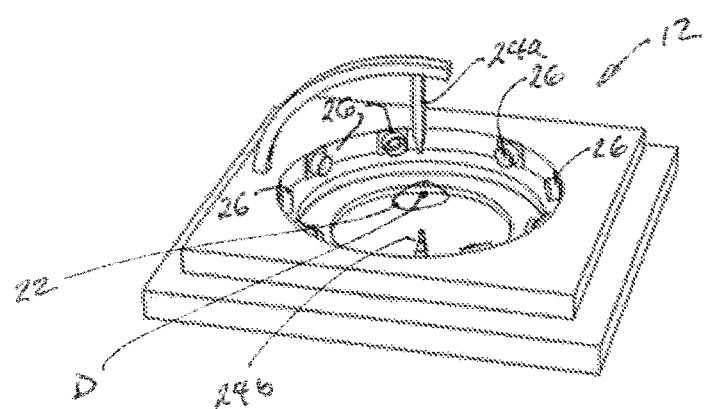
FIG. 7 is an image of the laser assisted electron spinning/ion gas or electron cloud/plasma device.

FIG. 7 illustrates a further embodiment wherein a pair of opposed electrodes 24a, 24b are orthogonal to a plane containing circularly arranged lasers 26. Lasers 26 are directed inwardly at a center point D which coincides with the center of an accretion disc 22. The electrodes create the plasma in the accretion disc. The lasers spin and accelerate the accretion disc.

Figure 8:
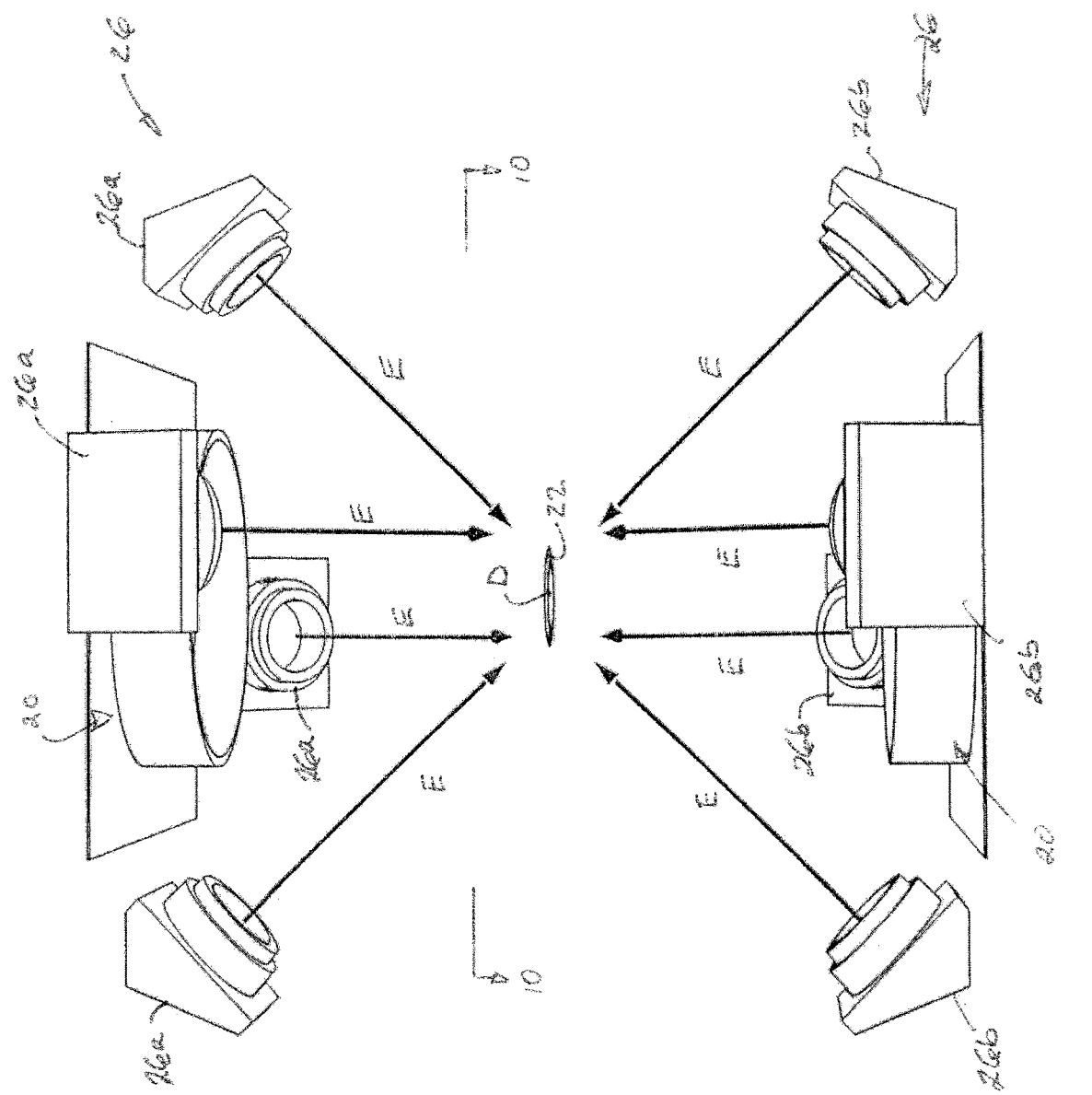
FIG. 8 is, in a side perspective view, a further arrangement of levitations devices and lasers spinning an accretion disc.
Figure 9:
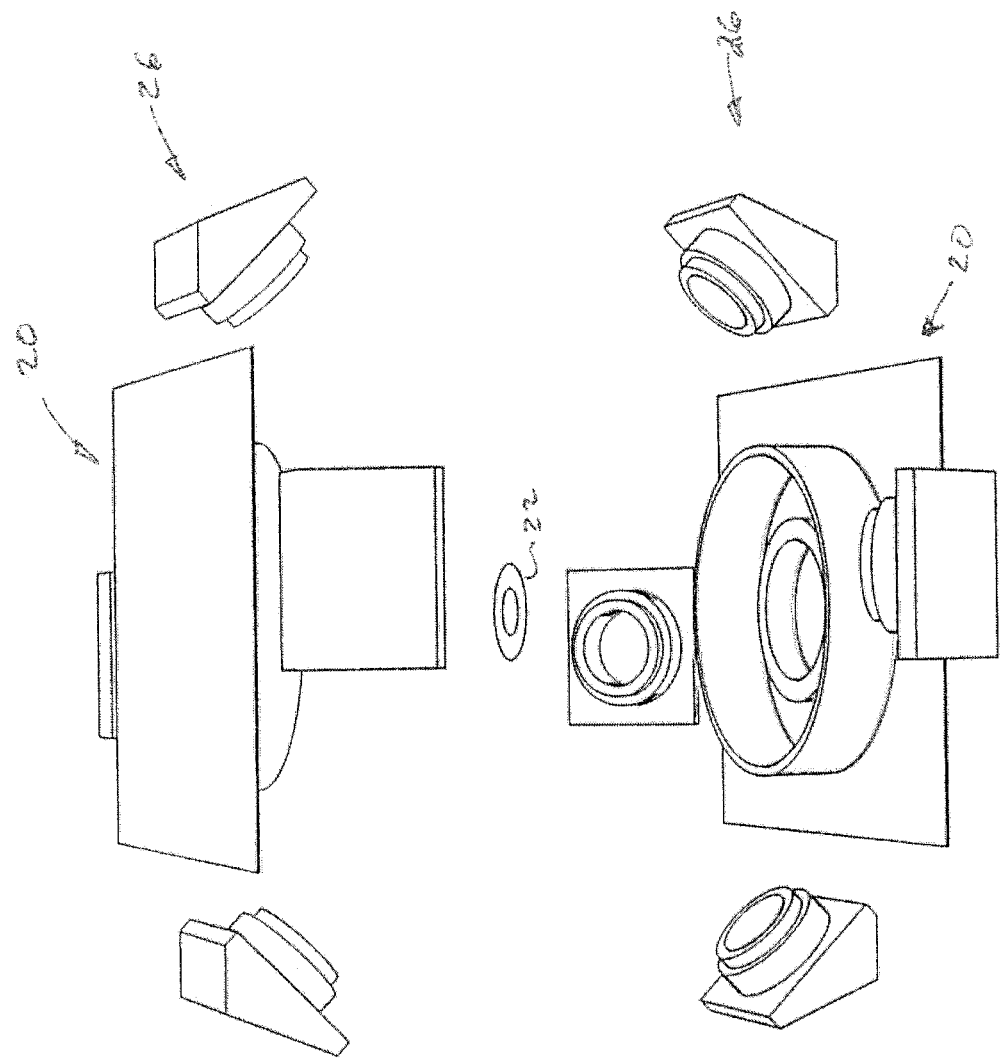
FIG. 9 is, in top perspective view, the arrangement of FIG. 8.
Figure 10:
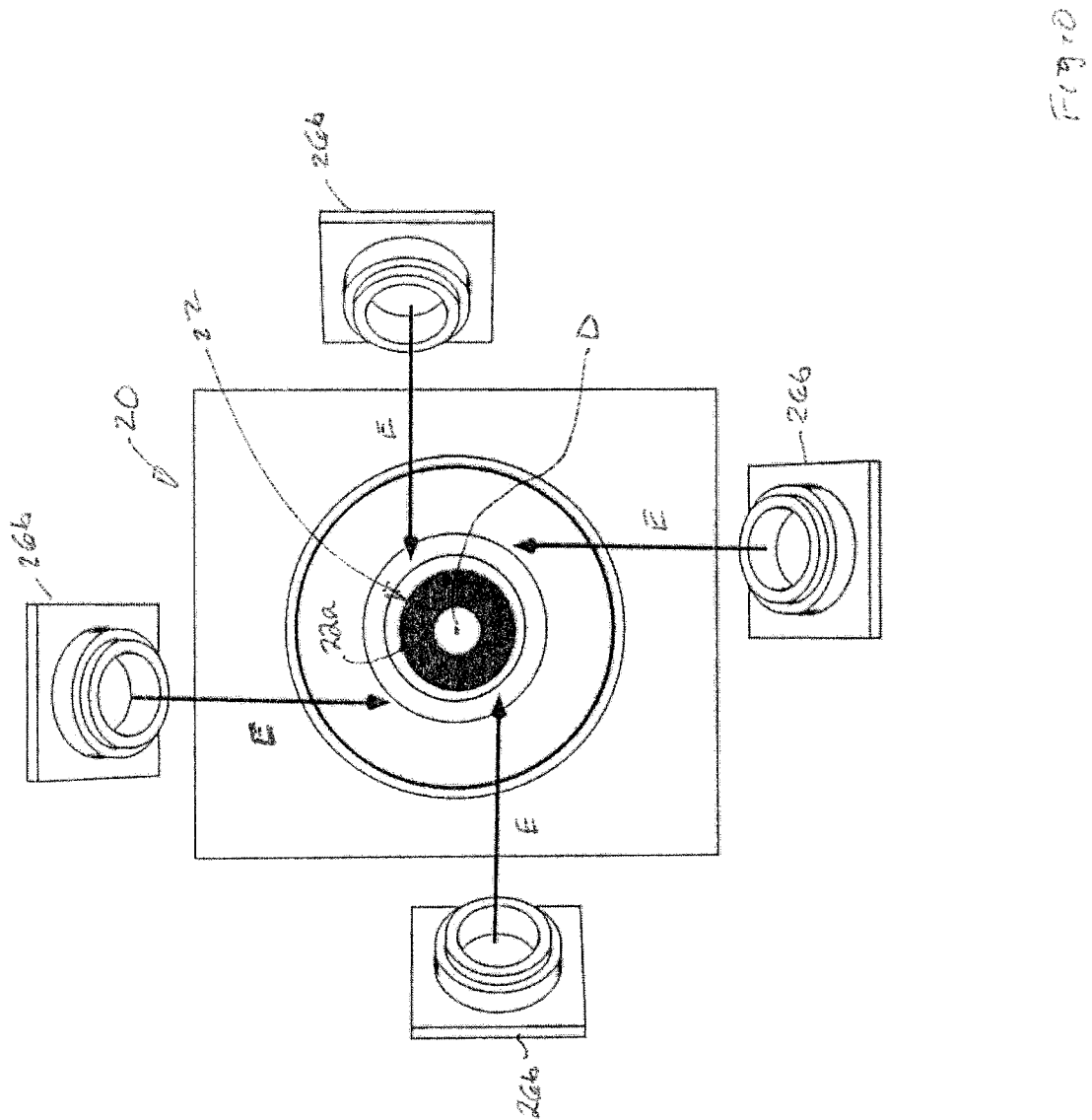
FIG. 10 is a sectional view along the line 10-10 in FIG. 8.

A further arrangement of levitation device 20 and lasers 26 is illustrated in FIGS. 8-10. As seen in FIG. 8, levitation devices 20 suspend an accretion disc 22 between them. A circularly arranged array of upper lasers 26a are arranged opposed to a correspondingly circularly array of lower lasers 26b. The laser radiated energy E from lasers 26, indicated by arrows E, are directed so as to be offset from center point D, whereat accretion disc 22 is formed, spun and accelerated. FIG. 9 shows accretion disc 22 in a perspective view. FIG. 10 is a sectional view in FIG. 8 along line 10-10 looking down on accretion disc 22 and lasers 26b. Radiated energy E from lasers 26 are offset from center point D and directed tangentially at the circumference 22a of accretion disc 22 so as to urge spinning and acceleration of the accretion disc. Radiated energy E from lasers 26 urge spinning of accretion disc 22 in the same direction.

Figure 11:
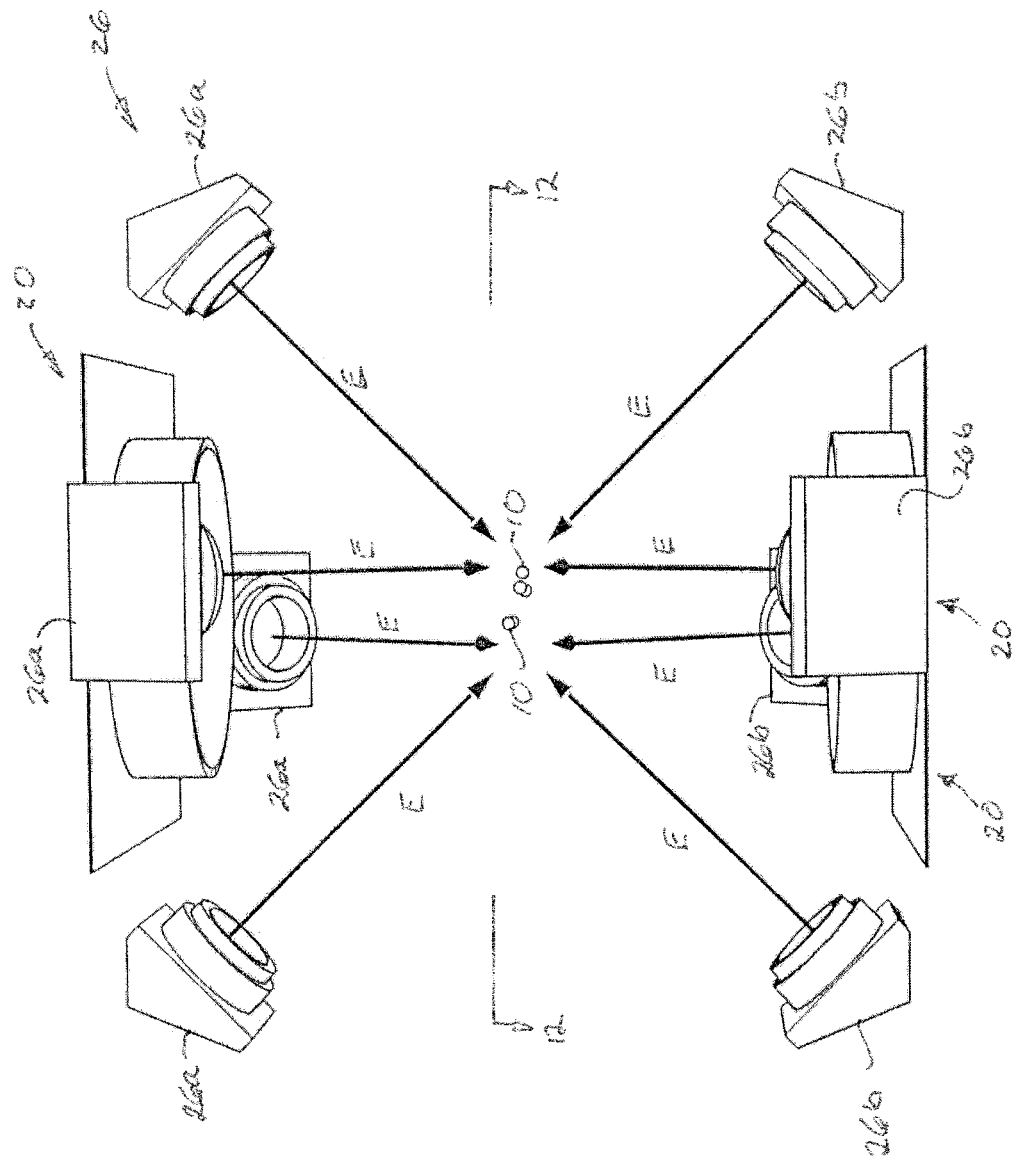
FIG. 11 is the view of FIG. 8 spinning nano spheres.
Figure 12:
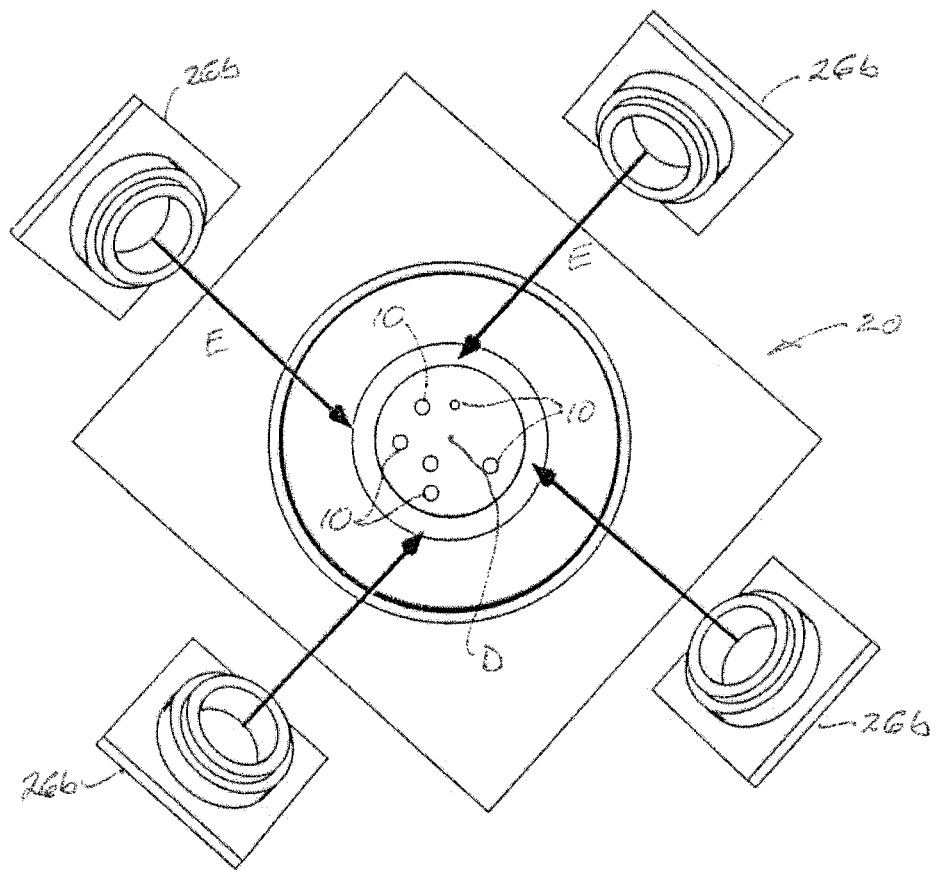
FIG. 12 is the sectional view along the line 12-12 in FIG. 11.

A similar arrangement of levitation devices 20 and lasers 26 is seen in FIGS. 11 and 12, wherein FIG. 12 is a section view along line 12-12 in FIG. 11, showing the suspension, spinning and acceleration of nano-spheres 10 instead of accretion disc 22. Again radiation energy E from lasers 26 are offset from center point D to assist in the spinning and acceleration of the cloud of nano-spheres.

What is claimed is:

1. A method of producing fuel comprising the steps of:
   a) providing a plurality of spinning bodies having mass,
   b) angularly accelerating the spinning bodies so as to spin each body in the plurality of spinning bodies at angular velocities approaching the speed of light to thereby store energy as stored energy in the plurality of spinning bodies,
   c) triggering a conversion of the stored energy from an angular momentum of at least parts of the spinning bodies of the plurality of spinning bodies so as to convert the stored energy to translational or radiation energy.

2. The method of claim 1 wherein the spinning bodies are chosen from the group comprising:
   i. nano structures,
   ii. nano spheres,
   iii. nano turbines,
   iv. atomic particles,
   v. subatomic particles.

3. The method of claim 2 wherein the spinning of the nano structures, nano spheres, nano turbines is laser driven.

4. The method of claim 3 further comprising providing a plasma cloud containing the spinning bodies.

5. The method of claim 2 wherein the triggering step is a triggering event comprising:
   a) For nano structures, nano spheres, nano turbines: heating the spinning bodies above a threshold temperature so as to break apart the nano structures, nano spheres, nano turbines,
   b) For atomic particles or sub-atomic particles, removing a containing plasma cloud containing the particles.

6. The method of claim 2 wherein the spinning of the atomic particles or subatomic particles is caused by applying an alternating current.

7. The method of claim 6 further comprising containing the particles within a plasma cloud.

8. The method of claim 7 further comprising forming the plasma cloud into an accretion disc.

9. The method of claim 1 wherein the angular acceleration of step (b) includes acceleration so as to cause time dilation.

10. The method of claim 9 wherein the spinning bodies are atomic or sub-atomic particles, the method further comprising forming a plasma cloud accretion disc and accreting further atomic or sub-atomic particles during the time dilation to thereby store further energy for release following the triggering step, wherein the triggering step includes disabling the plasma cloud.

* * * * *